(12) United States Patent
Masuda

(10) Patent No.: US 8,584,433 B2
(45) Date of Patent: Nov. 19, 2013

(54) STRUCTURE FOR INSTALLING INSERT NUT IN A PANEL

(75) Inventor: Mitsutaka Masuda, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 179 days.

(21) Appl. No.: 13/353,045

(22) Filed: Jan. 18, 2012

(65) Prior Publication Data

US 2012/0219355 A1 Aug. 30, 2012

(30) Foreign Application Priority Data

Feb. 24, 2011 (JP) ................................ 2011-038079

(51) Int. Cl.
*E04C 2/54* (2006.01)

(52) U.S. Cl.
USPC ........ 52/787.1; 52/125.5; 52/309.2; 52/704; 52/793.1; 411/82.1

(58) Field of Classification Search
USPC ................ 52/125.5, 309.2, 704, 707, 783.1, 52/787.7, 793.1, 794.1; 411/82, 82.1
See application file for complete search history.

(56) References Cited

U.S. PATENT DOCUMENTS

| | | | | |
|---|---|---|---|---|
| 3,019,865 A | * | 2/1962 | Rohe | 52/787.12 |
| 3,716,092 A | * | 2/1973 | Serewicz | 411/82.5 |
| 3,771,272 A | * | 11/1973 | Mihaly et al. | 52/787.1 |
| 4,027,711 A | * | 6/1977 | Tummarello | 411/172 |
| 4,273,818 A | * | 6/1981 | Buchs | 428/116 |
| 4,800,643 A | * | 1/1989 | Higgins | 29/458 |
| 5,082,405 A | | 1/1992 | Witten | |
| 5,093,957 A | * | 3/1992 | Do | 16/2.1 |
| 5,240,543 A | * | 8/1993 | Fetterhoff et al. | 156/293 |
| 5,890,340 A | * | 4/1999 | Kafarowski | 52/704 |
| 2008/0226413 A1 | * | 9/2008 | Stephen | 411/82.1 |

FOREIGN PATENT DOCUMENTS

| | | |
|---|---|---|
| JP | 03-272310 | 12/1991 |
| JP | 10-180914 | 7/1998 |
| JP | 11-348155 | 12/1999 |
| JP | 2009-073311 | 4/2009 |
| JP | 2009-137510 | 6/2009 |
| JP | 2009-137511 | 6/2009 |

* cited by examiner

*Primary Examiner* — Brian Glessner
*Assistant Examiner* — Brian D Mattei
(74) *Attorney, Agent, or Firm* — Thorpe North & Western LLP

(57) ABSTRACT

An insert nut is provided in a panel member made from a core member with a honeycomb structure, and a first and second surface plate and made from fiber reinforced plastic. A reinforcing member is provided at the location where the insert nut is provided in the core member. The insert nut is housed in a hole in the first surface plate, a hole in the first metal plate, and a hole in the reinforcing member, and fixedly attached with an adhesive. An inner circumferential surface of the hole in the first metal plate and an outer circumferential surface of the insert nut are in contact.

18 Claims, 6 Drawing Sheets

STRUCTURE FOR INSTALLING INSERT NUT IN A PANEL

PRIORITY CLAIM

Priority is claimed to Japan Patent Application Serial No. 2011-038079 filed on Feb. 24, 2011.

BACKGROUND

1. Technical Field

The present technology relates to a structure for installing an insert nut in a panel formed with a female screw, and in more detail, relates to a structure for installing an insert nut in a panel member made from a core member with a honeycomb structure and surface plates made from fiber reinforced plastic bonded to two sides of the core member.

2. Related Art

For example, lavatory units that include a toilet and a wash hand basin are installed inside aircraft. These lavatory units are constituted using panel members such as wall panels, floor panels, ceiling panels, door panels, and so on, made from a core member with a honeycomb structure and a first surface plate and a second surface plate made from fiber reinforced plastic bonded to two sides of the core member.

The door and wall panels of the lavatory units are connected with hinges so that the door panel can swivel, and the wall panels are connected together, or wall panels and floor panels or ceiling panels are connected together via angle members.

In this case, the hinges or angle members are fixed to the door or wall panels by screwing a screw or bolt into the female screw of an insert nut embedded in the panel members that form the door or wall panels.

FIGS. 11 and 12 show this type of conventional structure for installing an insert nut in a panel.

As shown in FIGS. 11 and 12, a panel member 10 is made from a core member 12 with a honeycomb structure, and a first and second surface plate 14 and 16 made from fiber reinforced plastic bonded to two sides of the core member 12.

In the structure shown in FIG. 11, an insert nut 18 is embedded in the core member 12 and bonded with adhesive 20 so that one end surface in the axial direction where the female screw 18A is open is coplanar with the first surface plate 14.

Also, in the structure shown in FIG. 12, at a position where the insert nut 18 is embedded in the core member 12, the core member 12 is replaced with a reinforcing member 22 made from urethane foam with high hardness and having greater strength and stiffness than that of the core member 12.

Also, the insert nut 18 is embedded in the reinforcing member 22 and bonded with the adhesive 20 so that one end surface in the axial direction where the female screw 18A is open is coplanar with the first surface plate 14.

Comparing the structure shown in FIG. 11 with the structure shown in FIG. 12, although the pull out strength of the insert nut 18 is equal, the shear strength is superior in the structure shown in FIG. 12 which uses the reinforcing member 22. Here the pull out strength of the insert nut 18 refers to the strength of the installation structure of the insert nut 18 to withstand the action of a force applied to the insert nut 18 embedded in the panel member 10 in the direction normal to the first surface plate 14 in the direction to separate away from the first surface plate 14. Also the shear strength of the insert nut 18 refers to the strength of the installation structure of the insert nut 18 to withstand the action of a force applied to the insert nut 18 embedded in the panel member 10 in a direction along the first surface plate 14.

SUMMARY

The present technology provides a structure for installing an insert nut in a panel and is capable of enhancing both the pull out strength and the shear strength of the insert nut while minimizing the increase in weight and cost.

The present technology for achieving this object is a structure for installing an insert nut in a panel, in which an insert nut in which a female screw is formed is provided in a panel member constituted from a core member with a honeycomb structure and from first and second surface plates made from fiber reinforced plastic fixedly attached to two sides of the core member. At a position in the core member where the insert nut is provided, the core member is replaced with a reinforcing member having a strength and a stiffness greater than that of the core member, and the insert nut is inserted into and housed in a hole in the reinforcing member from a hole in the first surface plate. A first end surface of the insert nut in the axial direction where the female screw is open is made coplanar with the first surface plate, and the insert nut is fixedly attached to the reinforcing member with an adhesive. A first metal plate is fixedly attached sandwiched between the first surface plate and the reinforcing member. The insert nut is inserted into the hole in the first surface plate, a hole in the first metal plate, and the hole in the reinforcing member, which are provided coaxially, and fixedly attached with the adhesive. In a state where the insert nut is fixedly attached with the adhesive, an inner circumferential surface of the hole of the first metal plate and an outer circumferential surface of the insert nut are in contact.

Also, the present technology is a structure for installing an insert nut in a panel, in which an insert nut in which a female screw is formed is provided in a panel member constituted from a core member with a honeycomb structure and from first and second surface plates made from fiber reinforced plastic fixedly attached to two sides of the core member. At a position in the core member where the insert nut is provided, the core member is replaced with a reinforcing member having a strength and a stiffness greater than that of the core member. The insert nut includes a body portion and a first collar portion and a second collar portion formed at the two ends of the body portion and having cross-sections larger than that of the body portion, and the female screw is formed from the first collar portion toward the body portion. The insert nut is inserted into and housed in a hole in the reinforcing member from a hole in the first surface plate, an end surface of the first collar portion where the female screw is open is made coplanar with the first surface plate, and the insert nut is fixedly attached to the reinforcing member with an adhesive. A first metal plate is fixedly attached sandwiched between the first surface plate and the reinforcing member. The insert nut is inserted into the hole in the first surface plate, a hole in the first metal plate, and the hole in the reinforcing member, which are provided coaxially, and fixedly attached with the adhesive. In a state where the insert nut is fixedly attached with the adhesive, an inner circumferential surface of the hole of the first metal plate and an outer circumferential surface of the first collar portion are in contact.

Also, the present technology is a structure for installing an insert nut in a panel, in which an insert nut in which a female screw is formed is provided in a panel member constituted from a core member with a honeycomb structure and from first and second surface plates made from fiber reinforced plastic fixedly attached to two sides of the core member. At a position in the core member where the insert nut is provided, the core member is replaced with a reinforcing member having a strength and a stiffness greater than that of the core member. The insert nut is inserted into and housed in a hole in the reinforcing member from a hole in the first surface plate, a first end surface of the insert nut in the axial direction where the female screw is open is made coplanar with the first surface plate, and the insert nut is fixedly attached to the reinforcing member with an adhesive. The insert nut is formed with a uniform external diameter. A first metal plate is fixedly attached sandwiched between the first surface plate and the reinforcing member. The insert nut is inserted into the hole in the first surface plate, a hole in the first metal plate, and the hole in the reinforcing member, which are provided coaxially, and fixedly attached with the adhesive. In a state where the insert nut is fixedly attached with the adhesive, an inner circumferential surface of the hole of the first metal plate and an outer circumferential surface of the insert nut are in contact.

According to the present technology, when a load is applied to the insert nut in the direction to pull out the insert nut, this load is dispersed to the reinforcing member via the adhesive, and dispersed from the reinforcing member to the core member. Then this load is transmitted from the reinforcing member to the first metal plate, so the first metal plate functions to prevent deformation of the first surface plate, the reinforcing member, and the second surface plate. Therefore, it is possible to enhance the pull out strength of the insert nut.

Also, when a load is applied to the insert nut along the first surface plate (shear load), the outer circumferential surface of the insert nut and the inner circumferential surface of the hole of the first metal plate are in contact, and the insert nut and the first metal plate are directly coupled in the shearing direction, so the load is dispersed by the first metal plate to the reinforcing member, the core member, the first surface plate, and the second surface plate, so the load is taken over a wide area of the first metal plate, the reinforcing member, the core member, the first surface plate, and the second surface plate. Therefore, it is possible to enhance the shear strength of the insert nut.

The above effect can be achieved with a simple constitution providing a single first metal plate that has a small area and is thin, and therefore it is possible to enhance both the pull out strength and the shear strength of the insert nut while minimizing the increase in weight and cost.

DETAILED DESCRIPTION

Figure 1:
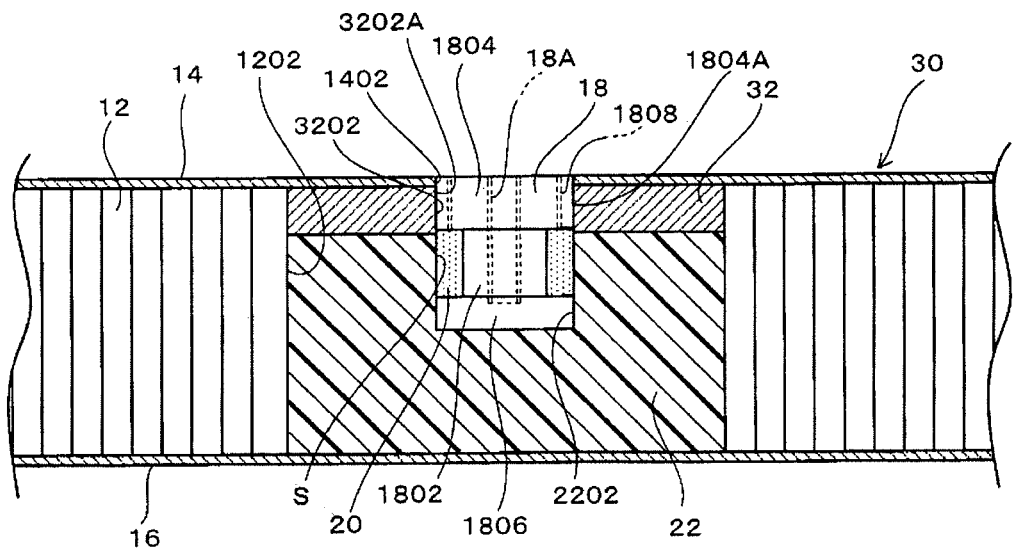
FIG. 1 is an explanatory illustration of the first embodiment, showing a cross-sectional view at the position where an insert nut is embedded in a panel member.

Embodiments of the present technology are described below based on the drawings. In the following explanations of the embodiments, the same reference numerals are assigned to members and locations that are the same as the conventional members and locations.

First Embodiment

First, a first embodiment is explained.

As shown in FIG. 1, wall panels, floor panels, ceiling panels, doors, and so on for lavatory units in aircraft are constituted from a panel member 30 made from a core member 12 with a honeycomb structure and a first surface plate 14 and a second surface plate 16 made from fiber reinforced plastic bonded to two sides of the core member 12.

Doors of lavatory units are connected to wall panels by hinges so that the doors can swivel. Additionally, wall panels are connected together with angle members, and wall panels and floor panels or ceiling panels are connected together with angle members. These hinges or angle members are fitted to the door or wall panels by screwing screws or bolts into a female screw 18A of insert nuts 18 embedded in the panel members 30.

Various commonly known materials such as paper impregnated with resin or aluminum and so on can be used in the core member 12 that is formed in a honeycomb structure.

Also, various commonly known fiber reinforced plastic panels, such as glass fiber reinforced plastic panels or carbon fiber reinforced plastic panels, can be used for the first surface plate 14 and the second surface plate 16.

The insert nut 18 includes a body portion 1802, and a first collar portion 1804 and a second collar portion 1806 having cross-sections larger than the body portion 1802 formed at the two ends of the body portion 1802.

The female screw 18A is formed from the first collar portion 1804 toward the body portion 1802.

Also, a plurality of adhesive injection holes 1808 is formed in the first collar portion 1804 at intervals in the circumferential direction to the outside in the radial direction of the body portion 1802, communicating with the space between the first collar portion 1804 and the second collar portion 1806.

At a position where the insert nut 18 is embedded in the core member 12, the core member 12 is replaced with a reinforcing member 22 having greater strength and stiffness than that of the core member 12.

Also, a first metal plate 32 is provided between and sandwiched by the first surface plate 14 and the reinforcing member 22. A contour of the reinforcing member 22 and a contour of the first metal plate 32 coincide when viewed from the axial direction of the insert nut 18.

In other words, a hole 1202 is formed at the position where the insert nut 18 is embedded in the core member 12, and the reinforcing member 22 and the first metal plate 32 are housed in the hole 1202.

In the present embodiment, a high hardness resin foam having greater strength and stiffness than that of the core member 12 is used in the reinforcing member 22. Various commonly known materials can be used as the high hardness resin foam, such as urethane foam or the like.

An insert nut housing hole 2202 is formed in the center of the reinforcing member 22, having a bottom surface on which the second collar portion 1806 is placed and an inner circumferential surface that extends from the bottom surface to the first metal plate 32.

Various commonly known metal materials can be used for the first metal plate 32, such as aluminum, titanium, stainless steel, and so on.

Holes 3202 and 1402 are formed in the first metal plate 32 and the first surface plate 14 coaxial with the insert nut housing hole 2202 to enable the insert nut 18 to be inserted into the insert nut housing hole 2202.

The hole 3202 of the first metal plate 32 is formed with an inner circumferential surface 3202A of a size so as to contact with an outer circumferential surface 1804A of the first collar portion 1804 when the insert nut 18 is housed in the insert nut housing hole 2202 with the second collar portion 1806 placed on the bottom surface of the insert nut housing hole 2202.

In other words, the insert nut 18 is inserted into the insert nut housing hole 2202 from the hole 1402 of the first surface plate 14 and the hole 3202 of the first metal plate 32 and housed, and in this state, the inner circumferential surface 3202A of the hole 3202 of the first metal plate 32 and the outer circumferential surface 1804A of the first collar portion 1804 are in contact. Also, the surface of the first collar portion 1804 is coplanar with the first surface plate 14.

When the insert nut 18 is housed in the hole 1402 of the first surface plate 14, the hole 3202 of the first metal plate 32, and the insert nut housing hole 2202 in this manner, an annular gap S is formed between the inner circumferential surface of the insert nut housing hole 2202 and an outer circumferential surface of the body portion 1802.

When the annular gap S is filled with adhesive 20 from the adhesive injection holes 1808, the insert nut 18 is bonded to the reinforcing member 22 and the first metal plate 32.

Figure 10:
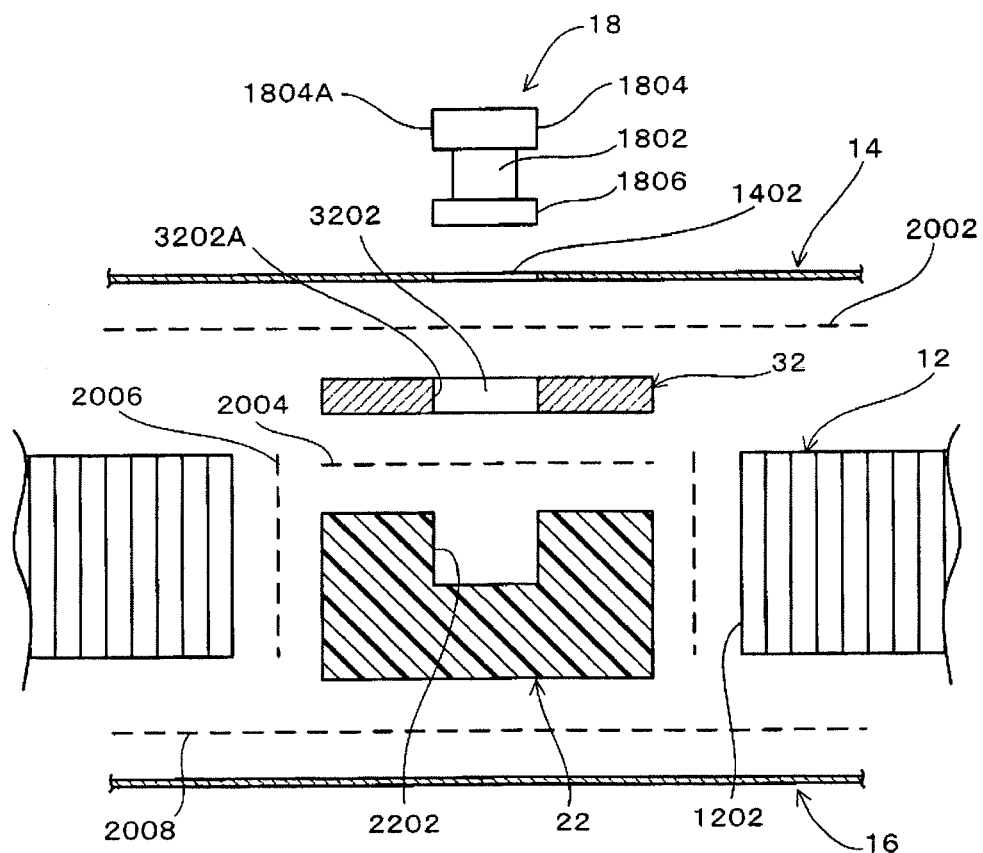
FIG. 10 shows the bonding relationship of the members that constitute the panel member.
Figure 11:
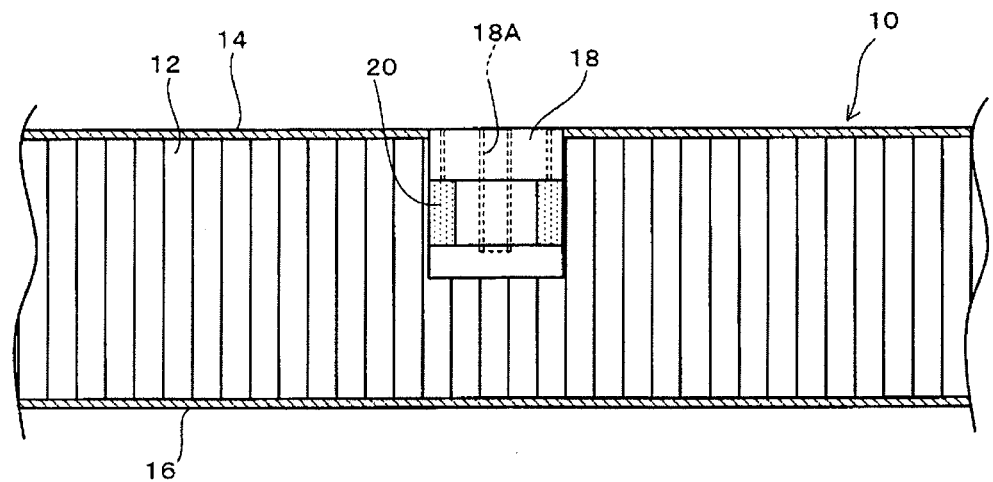
FIG. 11 is an explanatory illustration of a conventional structure, showing a cross-sectional view at the position where an insert nut is embedded in a panel member.
Figure 12:
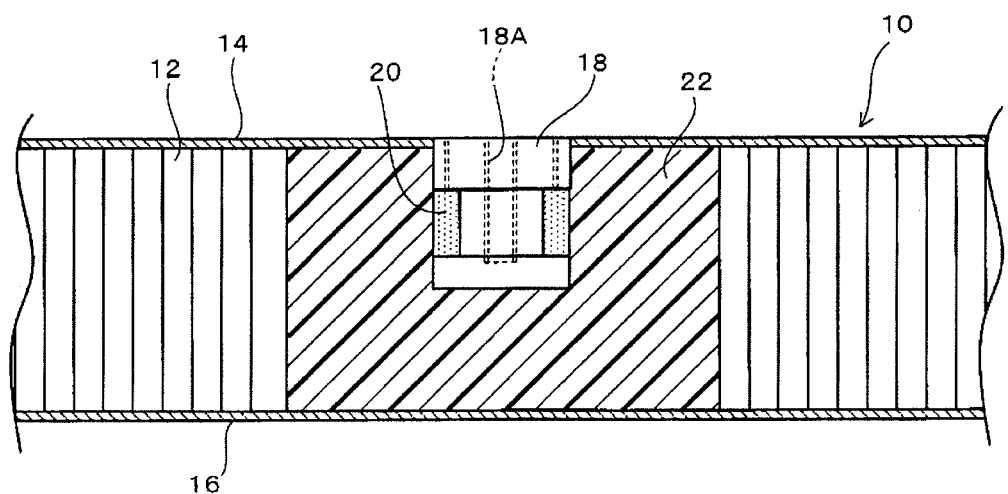
FIG. 12 is an explanatory illustration of a conventional structure, showing a cross-sectional view at the position where an insert nut is embedded in a panel member.

As shown in FIG. 10, one surface of the core member 12 and the first metal plate 32 are fixedly attached to the first surface plate 14 by bonding with adhesive 2002.

Also, the reinforcing member 22 and the first metal plate 32 are fixedly attached by bonding with film adhesive 2004.

Also, an outer circumferential surface of the reinforcing member 22 and an outer circumferential surface of the first metal plate 32 are fixedly attached to an inner circumferential surface of the hole 1202 of the core member 12 by bonding with film adhesive 2006.

Also, a second surface of the core member 12 and a second surface of the reinforcing member 22 are fixedly attached to the second surface plate 16 by bonding with adhesive 2008.

According to the present embodiment, when a load is applied to the insert nut 18 in the direction to pull out the insert nut 18, this load is dispersed to the reinforcing member 22 via the adhesive 20 filling the annular gap S, and dispersed from the reinforcing member 22 to the core member 12.

Also, the load is transmitted from the reinforcing member 22 to the first metal plate 32, so the first metal plate 32 functions to prevent deformation of the first surface plate 14, the reinforcing member 22, and the second surface plate 16.

Therefore, it is possible to enhance the pull out strength of the insert nut 18.

Also, when a load is applied to the insert nut 18 along the first surface plate 14 (shear load), the outer circumferential surface 1804A of the first collar portion 1804 and the inner circumferential surface 3202A of the hole 3202 of the first metal plate 32 are in contact, and the insert nut 18 and the first metal plate 32 are directly coupled in the shearing direction, so the load is dispersed by the first metal plate 32 to the reinforcing member 22, the core member 12, the first surface plate 14, and the second surface plate 16, and therefore the load is taken over a wide area of the first metal plate 32, the reinforcing member 22, the core member 12, the first surface plate 14, and the second surface plate 16.

Therefore, it is possible to enhance the shear strength of the insert nut 18.

The above effect can be achieved with a simple constitution providing a single first metal plate 32 that has a small area and is thin, and therefore it is possible to enhance both the pull out strength and the shear strength of the insert nut 18 while minimizing the increase in weight and cost.

Second Embodiment

Next, a second embodiment will be described while referencing FIG. 2.

The second embodiment differs from the first embodiment in the material of the reinforcing member 22.

Namely, the second embodiment uses a metal material with a honeycomb structure as the reinforcing member 22. Various commonly known metal materials can be used as this material, such as aluminum, titanium, stainless steel, and so on.

The same effect as the first embodiment is also exhibited by the second embodiment.

Third Embodiment

Figure 3:
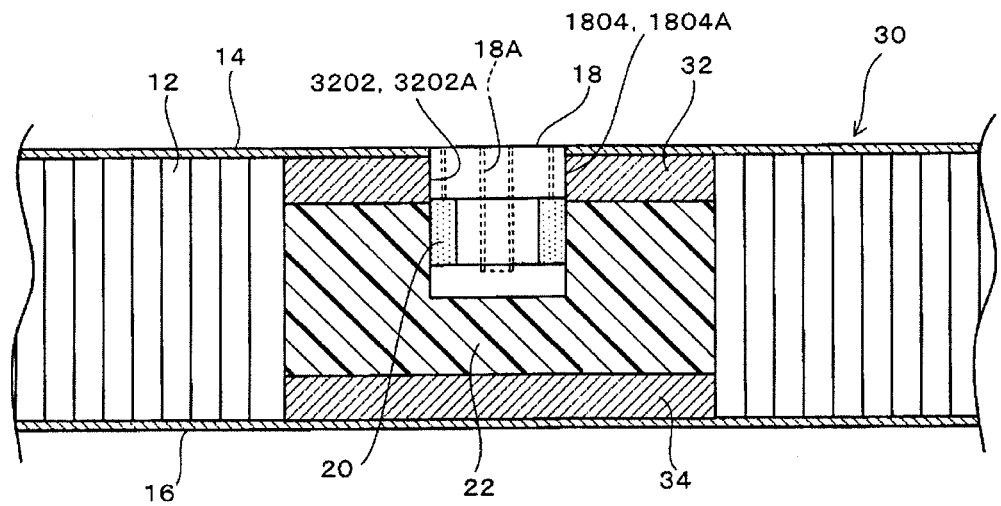
FIG. 3 is an explanatory illustration of the third embodiment, showing a cross-sectional view at the position where an insert nut is embedded in a panel member.

Next, a third embodiment will be described while referencing FIG. 3.

The third embodiment is the first embodiment having a second metal plate 34 added thereto.

In other words, the second metal plate 34 is sandwiched between the second surface plate 16 and the reinforcing member 22, and fixedly attached thereto with adhesive.

Various commonly known metal materials can be used for the second metal plate 34, such as aluminum, titanium, stainless steel, and so on, the same as for the first metal plate 32.

According to the third embodiment, when a load is applied to the insert nut 18 in the direction to pull out the insert nut 18, this load is dispersed to the reinforcing member 22 via the adhesive filling the annular gap S, and dispersed from the reinforcing member 22 to the core member 12. Also, the load is transmitted from the reinforcing member 22 to the first metal plate 32 and the second metal plate 34, so the first metal plate 32 and the second metal plate 34 function to prevent deformation of the first surface plate 14, the reinforcing member 22, and the second surface plate 16.

Therefore, it is possible to further enhance the pull out strength of the insert nut 18.

Also, when a load is applied to the insert nut 18 along the first surface plate 14 (shear load), the outer circumferential surface 1804A of the first collar portion 1804 and the inner circumferential surface 3202A of the hole 3202 of the first metal plate 32 are in contact, and the insert nut 18 and the first metal plate 32 are directly coupled in the shearing direction, so the load is dispersed by the first metal plate 32 to the reinforcing member 22, the core member 12, the first surface plate 14, and dispersed from the reinforcing member 22 to the second metal plate 34 and the second surface plate 16, and therefore the load is taken over a wide area of the first metal plate 32, the reinforcing member 22, the core member 12, the first surface plate 14, the second metal plate 34, and the second surface plate 16.

Therefore, it is possible to further enhance the shear strength of the insert nut 18.

The above effect can be achieved with a simple constitution providing the first metal plate 32 and the second metal plate 34 that have a small area and are thin, and therefore it is possible to further enhance both the pull out strength and the shear strength of the insert nut 18 while minimizing the increase in weight and cost.

Fourth Embodiment

Figure 4:
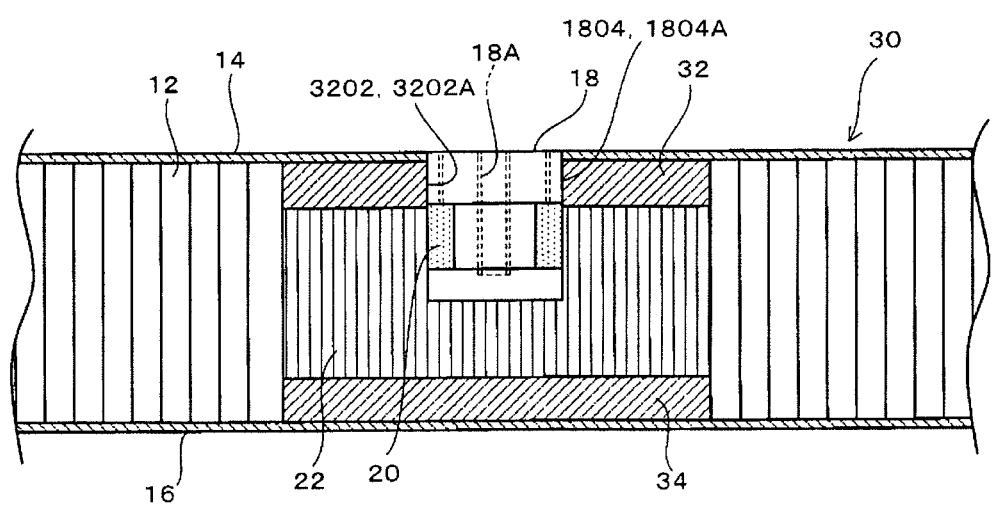
FIG. 4 is an explanatory illustration of the fourth embodiment, showing a cross-sectional view at the position where an insert nut is embedded in a panel member.

Next, a fourth embodiment will be described while referencing FIG. 4.

The fourth embodiment differs from the third embodiment in the material of the reinforcing member 22.

Namely, the fourth embodiment uses a material with a metal honeycomb structure as the reinforcing member 22. Various commonly known metal materials can be used as this material, such as aluminum, titanium, stainless steel, and so on.

The same effect as the third embodiment is also exhibited by the fourth embodiment.

Fifth Embodiment

Next, a fifth embodiment will be described while referencing FIG. 5.

The fifth through ninth embodiments differ from the first through fourth embodiments in the shape of the insert nut 18.

Figure 5:
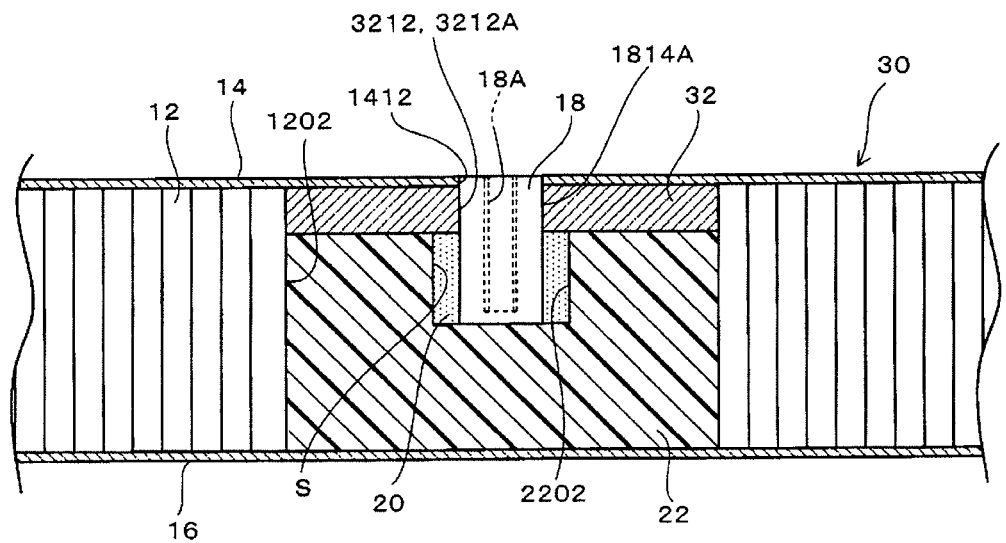
FIG. 5 is an explanatory illustration of the fifth embodiment, showing a cross-sectional view at the position where an insert nut is embedded in a panel member.

As shown in FIG. 5, the insert nut 18 is formed with a uniform external diameter in the longitudinal direction thereof.

The panel member 30 according to the fifth embodiment is constituted the same as the first embodiment shown in FIG. 1, and includes the core member 12 with a honeycomb structure, the first and second surface plates 14 and 16, the reinforcing member 22, and the first metal plate 32.

The insert nut housing hole 2202 is formed in the center of the reinforcing member 22.

The insert nut housing hole 2202 includes a bottom surface with an external diameter of a larger size than that of the insert nut 18, on which is placed a second end surface of the insert nut 18 in the axial direction where the female screw 18A does not open, and an inner circumferential surface rising from the bottom surface to the first metal plate 32.

Holes 3212 and 1412 are formed in the first metal plate 32 and the first surface plate 14 coaxial with the insert nut housing hole 2202 to enable the insert nut 18 to be inserted into the insert nut housing hole 2202.

The hole 3212 of the first metal plate 32 is formed with an inner circumferential surface of a size so as to contact with an outer circumferential surface 1814A of the insert nut 18 when the insert nut 18 is housed in the insert nut housing hole 2202 with the end surface of the insert nut 18 placed on the bottom surface of the insert nut housing hole 2202.

In other words, the insert nut 18 is inserted into the insert nut housing hole 2202 from the hole 1412 of the first surface plate 14 and the hole 3212 of the first metal plate 32 and housed, and in this state, the inner circumferential surface 3202A of the hole 3202 of the first metal plate 32 and the outer circumferential surface 1814A of the insert nut 18 are in contact. Also, a first end surface of the insert nut 18 in the axial direction where the female screw 18A is open is coplanar with the first surface plate 14.

When the insert nut 18 is housed in the hole 1412 of the first surface plate 14, the hole 3212 of the first metal plate 32, and the insert nut housing hole 2202 in this manner, an annular gap S is formed between the inner circumferential surface of the insert nut housing hole 2202 and the outer circumferential surface 1814A of the insert nut 18.

Adhesive 20 is injected into the insert nut housing hole 2202 in advance from the hole 1412 of the first surface plate 14 and the hole 3212 of the first metal plate 32, and thereafter the insert nut 18 is inserted, so the insert nut 18 is bonded to the reinforcing member 22 and the first metal plate 32 by the adhesive 20 that has filled the annular gap S.

The same effect as the first embodiment is also exhibited by the fifth embodiment.

Namely, when a load is applied to the insert nut 18 in the pull out direction, this load is dispersed from the reinforcing member 22 to the core member 12 via the adhesive 20, and this load is transmitted from the reinforcing member 22 to the first metal plate 32, so the first metal plate 32 functions to prevent deformation of the first surface plate 14, the reinforcing member 22, and the second surface plate 16.

Therefore, it is possible to enhance the pull out strength of the insert nut 18.

Also, when a load is applied to the insert nut 18 along the first surface plate 14 (shear load), the outer circumferential surface 1814A of the insert nut 18 and an inner circumferential surface 3212A of the hole 3212 of the first metal plate 32 are in contact, and the insert nut 18 and the first metal plate 32 are directly coupled in the shearing direction, so the load is dispersed by the first metal plate 32 to the reinforcing member 22, the core member 12, the first surface plate 14, and the second surface plate 16, and therefore the load is taken over a wide area of the first metal plate 32, the reinforcing member 22, the core member 12, the first surface plate 14, and the second surface plate 16.

Therefore, it is possible to enhance the shear strength of the insert nut 18.

The above effect can be achieved with a simple constitution providing a single first metal plate 32 that has a small area and is thin, and therefore it is possible to enhance both the pull out strength and the shear strength of the insert nut 18 while minimizing the increase in weight and cost.

Sixth Embodiment

Figure 6:
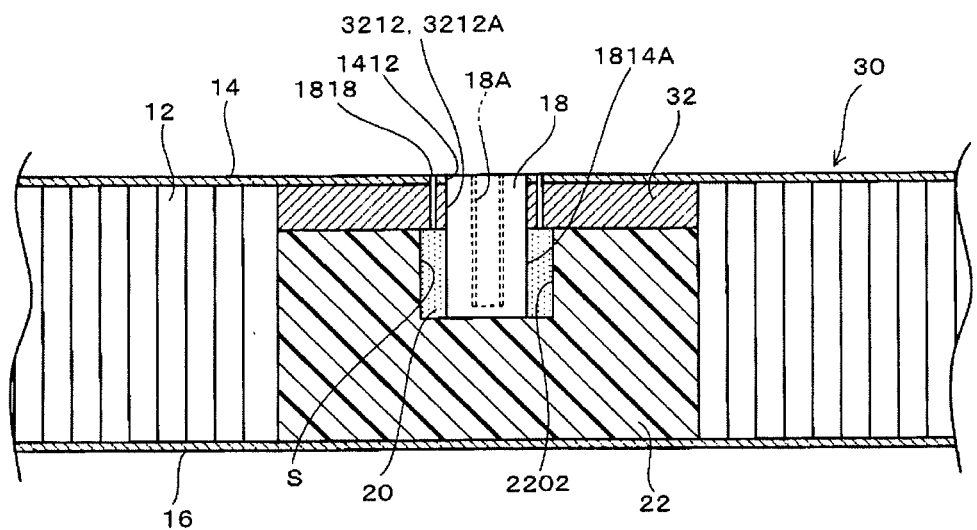
FIG. 6 is an explanatory illustration of the sixth embodiment, showing a cross-sectional view at the position where an insert nut is embedded in a panel member.

Next, a sixth embodiment will be described while referencing FIG. 6.

The sixth embodiment is the fifth embodiment having an adhesive injection hole 1818 added thereto.

A plurality of adhesive injection holes 1818 is formed in the first surface plate 14 and the first metal plate 32 at intervals in the circumferential direction of the insert nut 18, so as to communicate with the annular gap S.

In the sixth embodiment, after the insert nut 18 is housed in the hole 1412 of the first surface plate 14, the hole 3212 of the first metal plate 32, and the insert nut housing hole 2202, the annular gap S can be filled with adhesive 20 from the adhesive injection holes 1818.

The same effect as the fifth embodiment is also exhibited by the sixth embodiment.

In the following embodiments, the adhesive injection holes 1818 may also be provided.

Seventh Embodiment

Figure 7:
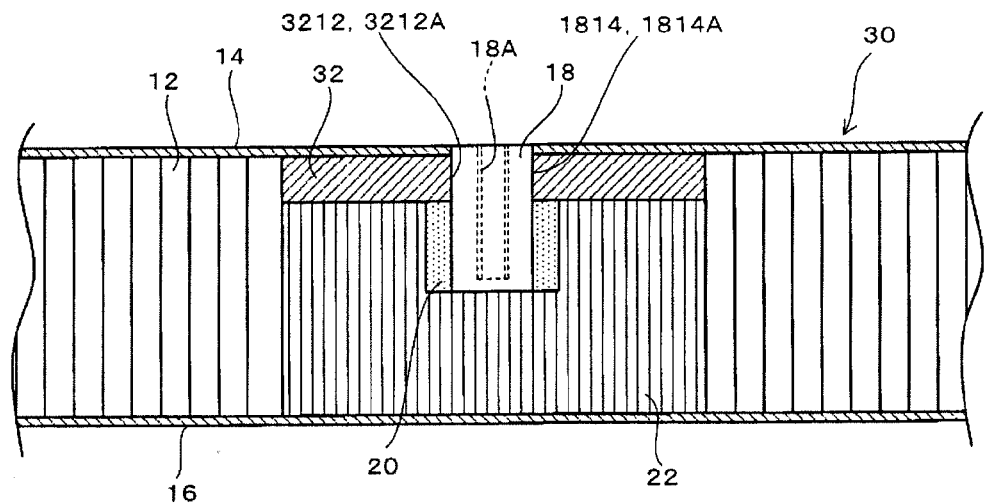
FIG. 7 is an explanatory illustration of the seventh embodiment, showing a cross-sectional view at the position where an insert nut is embedded in a panel member.

Next, a seventh embodiment will be described while referencing FIG. 7.

The seventh embodiment differs from the fifth embodiment in the material of the reinforcing member 22.

Figure 2:
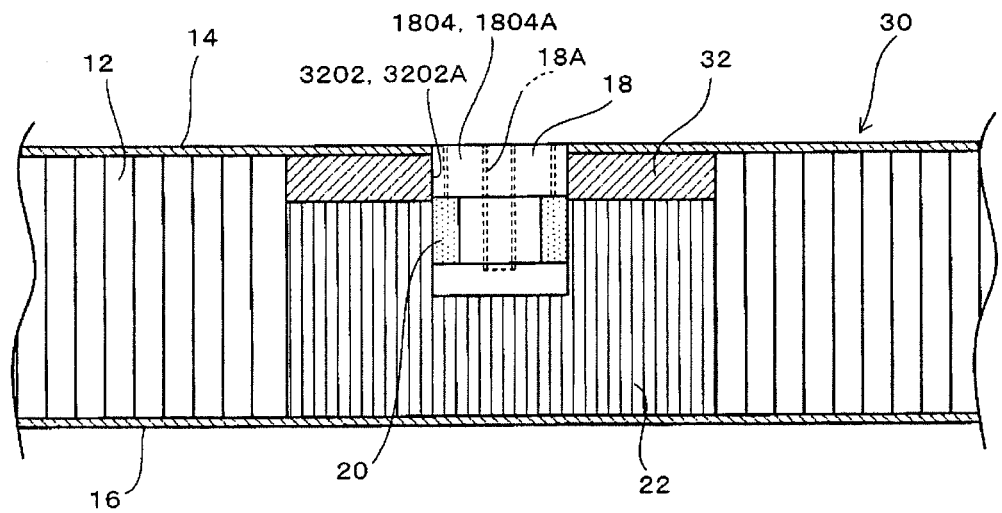
FIG. 2 is an explanatory illustration of the second embodiment, showing a cross-sectional view at the position where an insert nut is embedded in a panel member.

Namely, the seventh embodiment uses a material with a metal honeycomb structure as the reinforcing member 22, the same as the second embodiment shown in FIG. 2. Various commonly known metal materials can be used as this material, such as aluminum, titanium, stainless steel, and so on.

The same effect as the fifth embodiment is also exhibited by the seventh embodiment.

Eighth Embodiment

Figure 8:
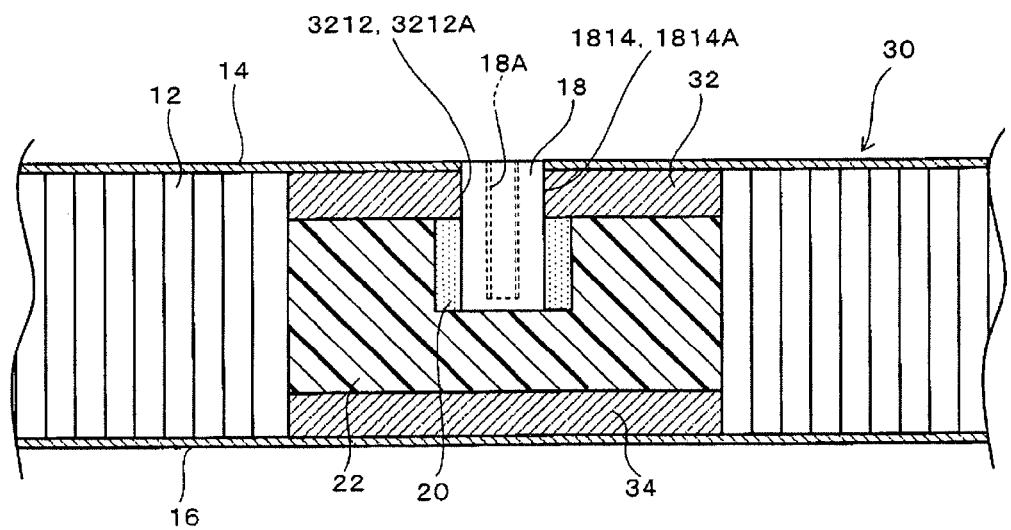
FIG. 8 is an explanatory illustration of the eighth embodiment, showing a cross-sectional view at the position where an insert nut is embedded in a panel member.

Next, an eighth embodiment will be described while referencing FIG. 8.

The eighth embodiment is the fifth embodiment having the second metal plate 34 added thereto.

In other words, the second metal plate 34 is sandwiched between the second surface plate 16 and the reinforcing member 22, and fixedly attached thereto with adhesive.

Various commonly known metal materials can be used for the second metal plate 34, such as aluminum, titanium, stainless steel, and so on, the same as for the first metal plate 32.

According to the eighth embodiment, when a load is applied to the insert nut 18 in the direction to pull out the insert nut 18, this load is dispersed to the reinforcing member 22 via the adhesive 20 filling the annular gap S, and dispersed from the reinforcing member 22 to the core member 12. Also, the load is transmitted from the reinforcing member 22 to the first metal plate 32 and the second metal plate 34, so the first metal plate 32 and the second metal plate 34 function to prevent deformation of the first surface plate 14, the reinforcing member 22, and the second surface plate 16.

Therefore, it is possible to further enhance the pull out strength of the insert nut 18.

Also, when a load is applied to the insert nut 18 along the first surface plate 14 (shear load), the outer circumferential surface 1814A of the insert nut 18 and the inner circumferential surface 3212A of the hole 3212 of the first metal plate 32 are in contact, and the insert nut 18 and the first metal plate 32 are directly coupled in the shearing direction, so the load is dispersed by the first metal plate 32 to the reinforcing member 22, the core member 12, the first surface plate 14, and dispersed from the reinforcing member 22 to the second metal plate 34 and the second surface plate 16, and therefore the load is taken over a wide area of the first metal plate 32, the reinforcing member 22, the core member 12, the first surface plate 14, the second metal plate 34, and the second surface plate 16.

Therefore, it is possible to further enhance the shear strength of the insert nut 18.

The above effect can be achieved with a simple constitution providing the first metal plate 32 and the second metal plate 34 that have a small area and are thin, and therefore it is possible to further enhance both the pull out strength and the shear strength of the insert nut 18 while minimizing the increase in weight and cost.

Ninth Embodiment

Figure 9:
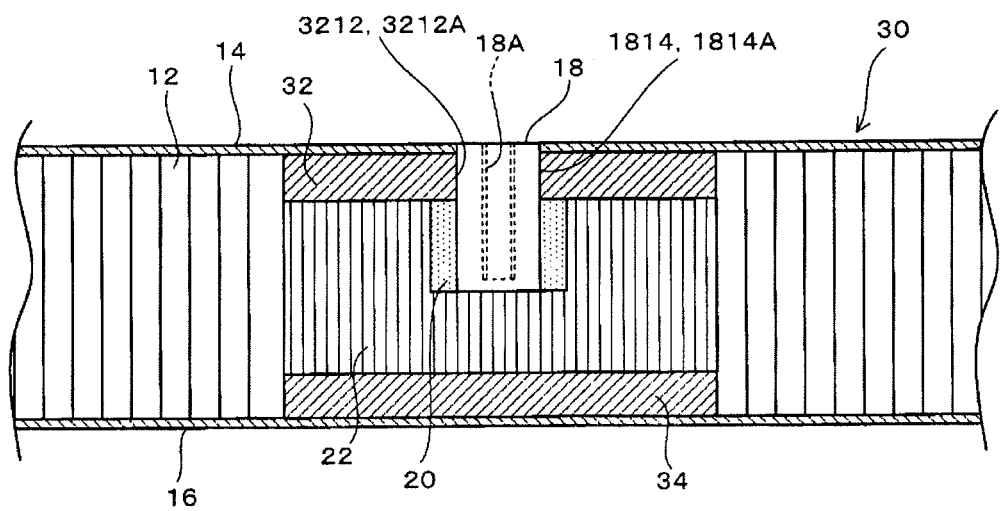
FIG. 9 is an explanatory illustration of the ninth embodiment, showing a cross-sectional view at the position where an insert nut is embedded in a panel member.

Next, a ninth embodiment will be described while referencing FIG. 9.

The ninth embodiment differs from the eighth embodiment in the material of the reinforcing member 22.

Namely, the ninth embodiment uses a material with a metal honeycomb structure as the reinforcing member 22. Various commonly known metal materials can be used as this material, such as aluminum, titanium, stainless steel, and so on.

The same effect as the eighth embodiment is also exhibited by the ninth embodiment.

What is claimed is:

1. A structure for installing an insert nut in a panel, in which an insert nut in which a female screw is formed is provided in a panel member constituted from a core member with a honeycomb structure and from first and second surface plates made from fiber reinforced plastic fixedly attached to two sides of the core member, at a position in the core member where the insert nut is provided, the core member is replaced with a reinforcing member having a strength and a stiffness greater than that of the core member, and the insert nut is inserted into and housed in a hole in the reinforcing member from a hole in the first surface plate, a first end surface in the axial direction where the female screw is open is made coplanar with the first surface plate, and the insert nut is fixedly attached to the reinforcing member with an adhesive, wherein a first metal plate is fixedly attached sandwiched between the first surface plate and the reinforcing member, the insert nut is inserted into the hole in the first surface plate, a hole in the first metal plate, and the hole in the reinforcing member, which are provided coaxially, and fixedly attached with the adhesive, and in a state where the insert nut is fixedly attached with the adhesive, an inner circumferential surface of the hole of the first metal plate and an outer circumferential surface of the insert nut are in contact.

2. The structure for installing an insert nut in a panel according to claim 1, wherein contours of the reinforcing member and the first metal plate coincide when viewed from the axial direction of the insert nut.

3. The structure for installing an insert nut in a panel according to claim 1, wherein a second metal plate is fixedly attached sandwiched between the second surface plate and the reinforcing member.

4. The structure for installing an insert nut in a panel according to claim 1, wherein the insert nut is formed with a uniform external diameter, and the insert nut includes a body portion and a first collar portion and a second collar portion formed at two ends of the body portion and having cross-sections larger than that of the body portion, and the female screw is formed from the first collar portion toward the body portion.

5. The structure for installing an insert nut in a panel according to claim 1, wherein the honeycomb structure comprises a metal honeycomb structure.

6. A structure for installing an insert nut in a panel, in which an insert nut in which a female screw is formed is provided in a panel member constituted from a core member with a honeycomb structure and from first and second surface plates made from fiber reinforced plastic fixedly attached to two sides of the core member, at a position in the core member where the insert nut is provided, the core member is replaced with a reinforcing member having a strength and a stiffness greater than that of the core member, the insert nut includes a body portion and a first collar portion and a second collar portion formed at two ends of the body portion and having cross-sections larger than that of the body portion, and the female screw is formed from the first collar portion toward the body portion, and the insert nut is inserted into and housed in a hole in the reinforcing member from a hole in the first surface plate, an end surface of the first collar portion where the female screw is open is made coplanar with the first surface plate, and the insert nut is fixedly attached to the reinforcing member with an adhesive, wherein a first metal plate is fixedly attached sandwiched between the first surface plate and the reinforcing member, the insert nut is inserted into the hole in the first surface plate, a hole in the first metal plate, and the hole in the reinforcing member, which are provided coaxially, and fixedly attached with the adhesive, and in a state where the insert nut is fixedly attached with the adhesive, an inner circumferential surface of the hole of the first metal plate and an outer circumferential surface of the first collar portion are in contact.

7. The structure for installing an insert nut in a panel according to claim 6, wherein the hole in the reinforcing member includes a bottom surface on which the second collar portion is placed, and an inner circumferential surface that extends from the bottom surface to the first metal plate, and the adhesive fills an annular gap between the inner circumferential surface and an outer circumferential surface of the body portion.

8. The structure for installing an insert nut in a panel according to claim 7, wherein an adhesive injection hole is formed in the first collar portion communicating with the annular gap.

9. The structure for installing an insert nut in a panel according to claim 6, wherein contours of the reinforcing member and the first metal plate coincide when viewed from the axial direction of the insert nut.

10. The structure for installing an insert nut in a panel according to claim 6, wherein a second metal plate is fixedly attached sandwiched between the second surface plate and the reinforcing member.

11. The structure for installing an insert nut in a panel according to claim 6, wherein the honeycomb structure comprises a metal honeycomb structure.

12. A structure for installing an insert nut in a panel, in which an insert nut in which a female screw is formed is provided in a panel member constituted from a core member with a honeycomb structure and from first and second surface plates made from fiber reinforced plastic fixedly attached to two sides of the core member, at a position in the core member where the insert nut is provided, the core member is replaced with a reinforcing member having a strength and a stiffness greater than that of the core member, and the insert nut is inserted into and housed in a hole in the reinforcing member from a hole in the first surface plate, a first end surface in the axial direction where the female screw is open is made coplanar with the first surface plate, and the insert nut is fixedly attached to the reinforcing member with an adhesive, wherein the insert nut is formed with a uniform external diameter, a first metal plate is fixedly attached sandwiched between the first surface plate and the reinforcing member, the insert nut is inserted into the hole in the first surface plate, a hole in the first metal plate, and the hole in the reinforcing member, which are provided coaxially, and fixedly attached with the adhesive, and in a state where the insert nut is fixedly attached with the adhesive, an inner circumferential surface of the hole of the first metal plate and an outer circumferential surface of the insert nut are in contact.

13. The structure for installing an insert nut in a panel according to claim 12, wherein the hole in the reinforcing member includes a bottom surface with an external diameter of a larger size than that of the insert nut, and on which a second end surface of the insert nut in the axial direction is placed, and an inner circumferential surface that extends from the bottom surface to the first plate member, and the adhesive fills an annular gap between the inner circumferential surface of the insert nut housing hole and the outer circumferential surface of the insert nut.

14. The structure for installing an insert nut in a panel according to claim 12, wherein an adhesive injection hole is formed in the first surface plate and the first metal plate communicating with the annular gap.

15. The structure for installing an insert nut in a panel according to claim 12, wherein contours of the reinforcing member and the first metal plate coincide when viewed from the axial direction of the insert nut.

16. The structure for installing an insert nut in a panel according to claim 12, wherein a second metal plate is fixedly attached sandwiched between the second surface plate and the reinforcing member.

17. The structure for installing an insert nut in a panel according to claim 16, wherein contours of the reinforcing member and the first metal plate and the second metal plate coincide when viewed from the axial direction of the insert nut.

18. The structure for installing an insert nut in a panel according to claim 12, wherein the honeycomb structure comprises a metal honeycomb structure.

\* \* \* \* \*